United States Patent
Schuhrke

[15] 3,694,750
[45] Sept. 26, 1972

[54] ALTERNATOR DRIVEN TACHOMETER
[72] Inventor: Donald K. Schuhrke, Chicago, Ill.
[73] Assignee: Stewart-Warner Corporation, Chicago, Ill.
[22] Filed: Oct. 29, 1970
[21] Appl. No.: 85,089

[52] U.S. Cl. ............................................. 324/173
[51] Int. Cl. ............................................... G01p 3/48
[58] Field of Search......324/163, 165, 173, 174, 169; 317/5; 340/263

[56] References Cited

UNITED STATES PATENTS

| | | | |
|---|---|---|---|
| 3,219,926 | 11/1965 | Dion | 324/169 |
| 3,314,007 | 4/1967 | Johnson | 324/173 |
| 3,329,893 | 7/1967 | Lawless | 324/173 |

OTHER PUBLICATIONS

H. W. Patton, An Accurate Magnetic Tachometer—Proc. of the National Electronics Conference, Vol. 11, 1956, pp. 183–192.

*Primary Examiner*—Michael J. Lynch
*Attorney*—Augustus G. Douvas, William J. Newman and Norton Lesser

[57] ABSTRACT

The following specification describes an alternator operated tachometer utilizing an air core gauge driven by a saturable transformer having one or more choke coils selectively connected to the transformer primary for providing a relatively constant energy input to the transformer independent of alternator output voltage or the use of a battery with the alternator. A housing within the tachometer magnetically insulates the gauge and the arrangement for mounting the components provides space savings while a resistor and zener diode limit the transformer output power applied to the gauge.

7 Claims, 11 Drawing Figures

INVENTOR
Donald K. Schuhrke
By Norton Lesser
Attorney

INVENTOR
Donald K. Schuhrke

By Norton Lesser
Attorney

INVENTOR
Donald K. Schuhrke

By _____
Attorney 3,694,750

ALTERNATOR DRIVEN TACHOMETER

BACKGROUND OF THE INVENTION

1. Field of the Invention

This invention relates in general to tachometers and more particularly to a tachometer of improved versatility and economy utilizing an air core gauge.

2. Description of the Prior Art

Snowmobiles incorporate alternators either with or without a battery and the output voltage or signal pulse therefrom varies within very wide limits dependent on the alternator speed, load and design. For example, output voltages may vary between 25 and 250 volts for each half cycle, if no battery is used and be clamped at 14 or 15 volts if a battery is used.

Tachometers also generally incorporate expensive gauges utilizing complicated magnetic circuits, which are difficult to control and require considerable circuit or design adaptations for use with different power sources such as provided with snowmobiles. It is therefore a difficult problem to provide an economical tachometer capable of use under the wide variety of circumstances encountered in snowmobiles, or the like, for indicating engine speed.

SUMMARY OF THE INVENTION

The present invention proposes to avoid these problems through the use of an air core gauge driven by a saturable transformer having its primary connected to a pair of choke coils whose reactance varies with signal frequency enabling the tachometer to be operated by a snowmobile alternator providing widely varying output voltages and irrespective of the use of a battery therewith.

The air core gauge used in the present invention also incorporates air core coils generating fields at right angles to each other, commonly known as a bi-torque gauge. The gauge is arranged in a separate housing within the tachometer housing to magnetically insulate the gauge from the fields of the choke coils and saturable transformer. The choke coils and transformer are arranged on respective spaced plates each having a recess for accommodating the respective component and enabling the tachometer to be accommodated in a relatively small housing and in an unusually compact arrangement. A zener diode and resistor are arranged in shunt with the gauge to limit the power applied thereto from the transformer.

It is accordingly among the objects of the present invention to provide an economical tachometer of improved versatility.

Other objects and features of the present invention will become apparent on examination of the following specification and claims together with the drawings.

DESCRIPTION OF THE INVENTION

Figure 1:
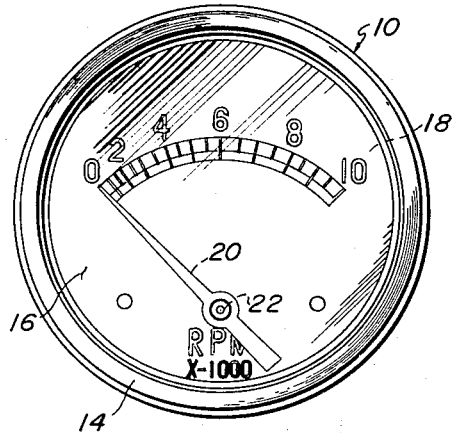
FIG. 1 is a front elevational view of a tachometer utilizing the principles of the present invention.
Figure 2:
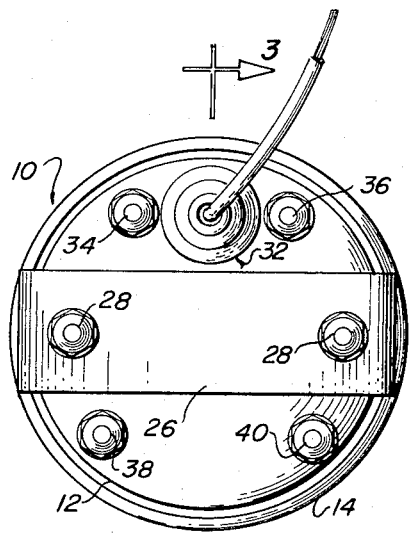
FIG. 2 is a rear elevational view of the tachometer shown in FIG. 1.

In FIGS. 1 and 2 a tachometer incorporating the principles of the present invention is indicated by the reference character 10. The tachometer 10 comprises a cup-shaped housing 12 seen in section in FIG. 3, having a bezel 14 fixed to the open end of the housing 12 for retaining a glass face plate 16 behind which a dial 18 is viewed having indicia marked thereon in RPM, or revolutions per minute.

Figure 3:
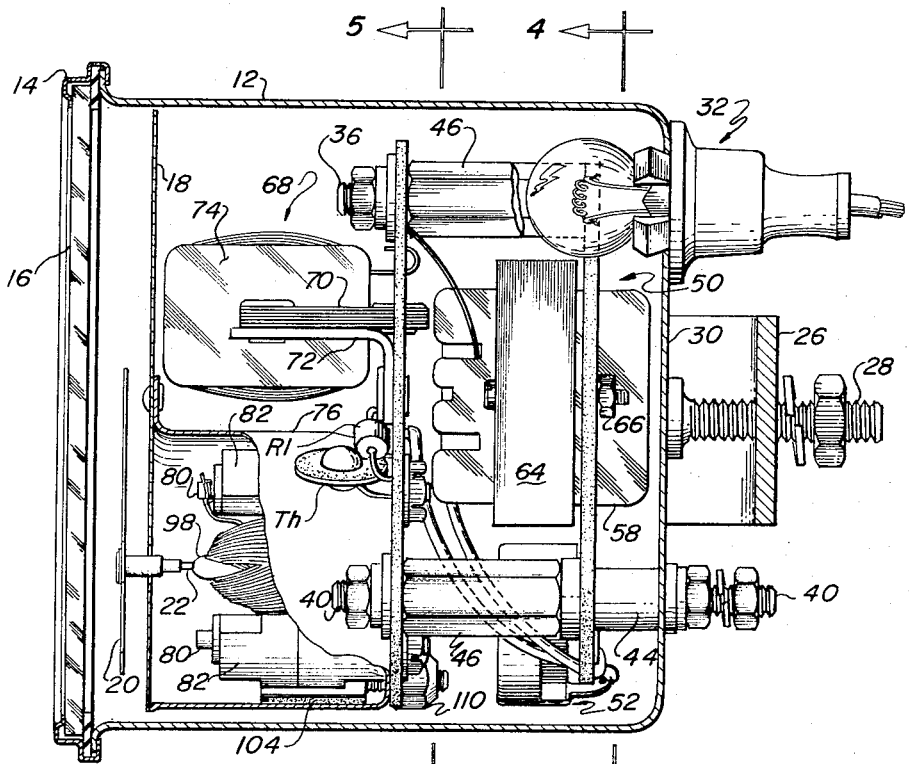
FIG. 3 is a sectional view taken along the line 3—3 in FIG. 2.
Figure 6:
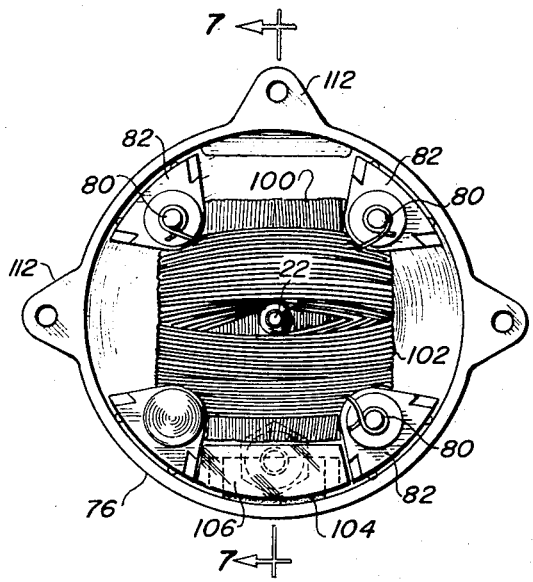
FIG. 6 is a front elevational view of the air core bi-torque gauge of the tachometer.
Figure 7:
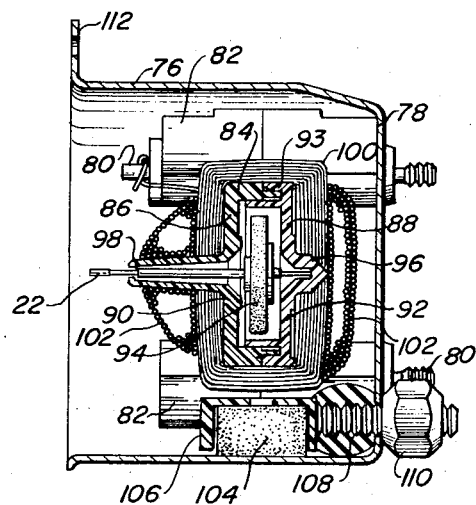
FIG. 7 is a sectional view of the gauge taken along the line 7—7 in FIG. 6.

The tachometer 10 indicates engine speed by means of a pointer or indicator needle 20 extending radially from one end of a pointer shaft 22 of an air core bi-torque gauge assembly 24, as seen in FIGS. 3, 6 and 7. The pointer 20 is moved to a position relative to dial 18 corresponding to the engine speed of a vehicle on which the tachometer 10 is mounted.

The tachometer 10 is conventionally mounted in a panel opening by means of a U-shaped bracket 26 supported on a pair of studs 28 extending from the rear wall 30 of the housing 12. The rear wall 30 is provided with an opening for receiving a conventional lamp assembly 32 within the housing 12 for lighting the gauge and has projecting therethrough four electrical terminals 34, 36, 38 and 40 for the purpose of extending electrical connections to the tachometer, as will be explained. The terminals 34, 36, 38 and 40 are electrically insulated from the housing 12 by means of appropriate sleeves.

A plate 43 which is of metal and is electrically insulated from the terminals 34, 36, 38 and 40, and a second plate 44 of electrically insulating material are supported by the terminals on wall 30 within the housing 12 and are spaced from wall 30 and from each other by means of spacers 44 and 46.

Figure 4:
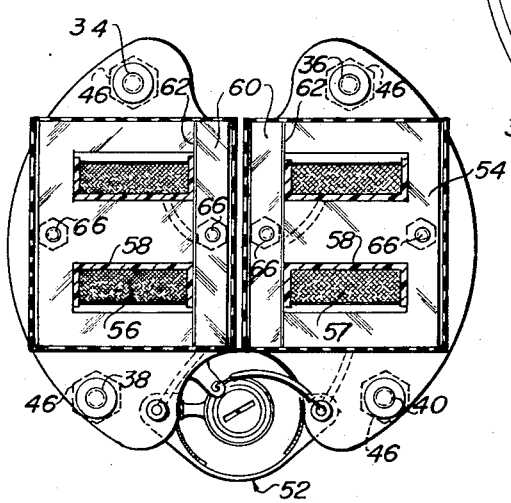
FIG. 4 is a sectional view taken along the line 4—4 in FIG. 2.
Figure 5:
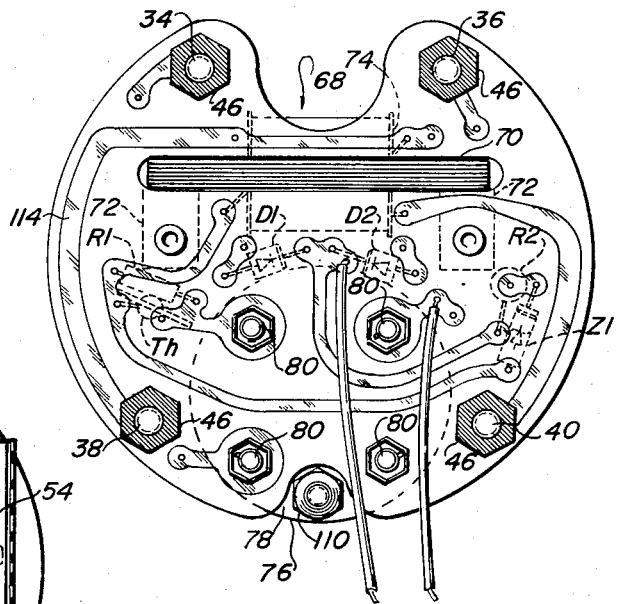
FIG. 5 is a sectional view taken along the line 5—5 in FIG. 3.

A pair of choke coil assemblies 48 and 50 are mounted on plate 42 on opposite sides of the vertical plate axis, as seen in FIG. 4, together with a potentiometer 52 adjacent the vertical plate axis and spanning a recess formed in the bottom portion of the plate 42 for enabling facile adjustment. The assemblies 48 and 50 each comprise a stack 54 of high silicon steel laminations or the like with a respective coil 56 and 57 formed of 240 turns of No. 23 wire located on a respective bobbin 58 carried by the center legs of the stack. A stack 60 of I laminations span the E laminations and are separated from the legs of the E laminations by a 0.008 in. brass shim 62. The coils 56 and 57 extend through respective openings in plate 42 which openings serve to accommodate the physical volume of the coil assemblies 48 and 50 in the space provided. A bracket 64 straddles each coil 56 and 57 and overlaps the laminations and each assembly 48 and 50 is fastened to plate 42 by means of screws 66.

Figure 8:
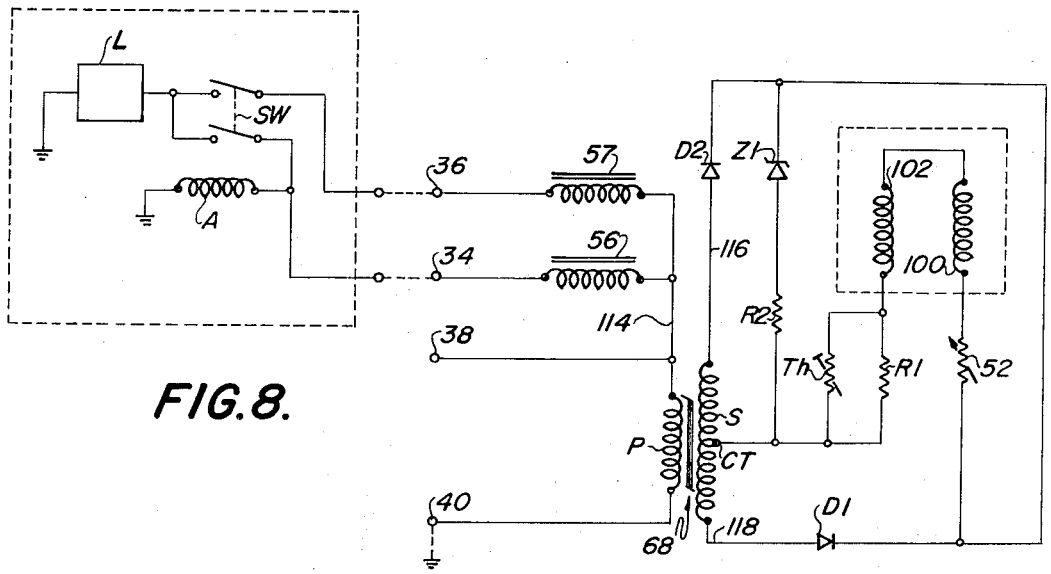
FIG. 8 is a circuit diagram of the tachometer illustrating the circuit connections to the alternator of a typical snowmobile that does not use a battery.

Electrical connections to the coils 56 and 57 and potentiometer 52 are extended from conductors carried on the second plate 44, which has a printed circuit formed thereon as illustrated in FIG. 8, and which carries a pair of resistors R1 and R2, a zener diode Z1, a pair of rectifying diodes D1 and D2, a thermistor Th, in addition to a saturable transformer 68 and the gauge assembly 24.

The saturable transformer 68 comprises two stacks of U-shaped laminations 70 formed of nickel alloy having a generally rectangular hysteresis loop with the back leg of each alternate lamination fitted across the gap of the adjacent lamination to form a rectangular stack. The laminations 70 are riveted together and to one leg of a pair of L-shaped brackets 72 whose other leg is riveted to the plate 44. A bobbin 74 carrying a Th primary winding P and a secondary winding S having a center tap CT is supported on one leg of the rectangle formed by laminations 70 and the opposing leg of the rectangle fits in an opening in plate 44 to conserve space. The primary P comprises 150 turns of No. 20 wire and the secondary S is formed of 720 turns of No. 34 wire with the center tap CT dividing the secondary into two halves of 360 turns each and the leads from the primary and secondary of transformer 68 are extended to plate 44 for connection to appropriate printed circuit conductors.

The gauge assembly 24 comprises a cup-shaped metal housing 76 having its back wall 78 fastened to plate 44 by means of studs 80 each extending through a respective tubular corner post 82 of a bobbin 84. Each corner post 82 has a short tubular portion extending rearwardly through wall 78 to electrically insulate the respective stud 80 from housing 76. Bobbin 84 comprises two shells 86 and 88 of a glass fitted plastic material each having aligned axially extending apertured ears that form the corner posts 82 and each shell has a respective radial wall 90 and 92, appropriately spaced apart by axially extending nested walls 93, as best seen in FIG. 7. A permanent magnet 94 in the form of a disc is located between walls 90 and 92 and is supported on shaft 22. The shaft 22 in turn is journalled at one end in an axial boss 96 extending rearwardly of wall 92 and the other end of shaft 22 extends through and is journalled in the end wall of an elongate forwardly extending axial boss 98 on wall 88.

In addition, a first coil 100 is wound around walls 90 and 92 with the coil axis perpendicular to the shaft axis and extending in a horizontal direction, and a second coil 102 is wound on the first coil 100 with the axis of coil 102 extending in a vertical direction perpendicular to both the shaft axis and the axis of coil 100. The coils 100 and 102 are connected serially at one of the studs 80 and the other end of the coils are connected to respective ones of the other studs 80.

Another permanent magnet 104 is located adjacent the bottom portion of the annular wall of housing 76 and between the two lower corner posts 82 for the purpose of biasing the magnet 90 and shaft 22 to a zero position and to generate a magnetic field opposing the field of coil 102 for enabling the coils to properly control the pointer shaft 22. The magnet 104 is seated in a recess of a plastic retainer 106 having a stud 108 extending through the back wall 78 of housing 76. A nut 110 is fastened on the stud 108 and both the stud and nut are fixed to wall 78 for positioning the retainer 106 and the magnet 104 axially relative the shaft 22 for adjusting the effect of the magnetic field. The dial 18 is fastened to a plurality of ears 112 formed on a flange at the open end of housing 76.

The choke coils 56 and 57 each have one terminal connected in common to a conductor 114 on plate 44 and conductor 114 is connected to one terminal of the primary P of transformer 68 and to terminal 38. The other terminal of coil 56 is connected to terminal 34 and the other terminal of coil 57 is connected to terminal 36. The other terminal of the primary P opposite that connected to terminal 38 is connected to terminal 40.

The secondary S of transformer 68 has opposite end terminals 116 and 118 connected to respective diodes D1 and D2 on plate 44 and these diodes are poled to pass current of positive polarity from the respective end terminals of secondary S through potentiometer 52 to one coil 100 of gauge 24 connected in series with coil 102 of the gauge and from coil 100 through resistor R1 connected in shunt with thermistor In on plate 44 to the center tap CT on transformer secondary S. A zener diode Z1 and a resistor R2 are also connected from the junction of diodes D1 and D2 to the center tap CT on transformer secondary S to limit the power applied to the gauge coils 100 and 102, as will be explained. 11.

In the case where the tachometer is utilized with a snowmobile that has no battery, an alternator winding indicated by the character A in FIG. 8, is usually provided for operating one or more vehicle lamps or electrical load indicated by the box marked L. The lamp L is energized through a switch SW and when the switch is operated the alternator output will drop from a peak AC voltage of approximately 250 volts at each half cycle with the engine operating at 10,000 R.P.M. to a peak of 25 volts for each half cycle. If the engine is operating at minimum or idle speed of approximately 1,000 R.P.M., the alternator output may have a peak of only 20 volts for each half cycle at 10,000 R.P.M. and only 15 volts at 1,000 R.P.M. with the rise and fall to and from peak values being far more gradual than when the engine is operating at maximum speed and no output load on the alternator. The output voltage of the alternator A under load and no load conditions and varying engine speed are indicated by the graphs G and G1, respectively, in FIG. --. The discussed output voltages, of course, simply relate to a general range of voltages which are, in fact, dependent on the characteristics of the particular alternator and the engine speed.

For use under the just described conditions without a battery, the tachometer terminal 34 is connected directly to the output of the alternator winding A. Terminal 40 is connected to the vehicle ground and terminal 38 is left disconnected. In some cases the switch SW is a single pole switch in which case terminal 36 is connected to the lamp input; however, the coil 57 remains disconnected from across the alternator in this case unless the switch is operated.

When the vehicle is operated with the switch SW open to prevent lamps L from visibly lighting, the output of the alternator is applied to terminal 34 across the choke coil 56 to the primary P of transformer 68. The d.c. resistance of each coil 56 and 57 is only about 1.07 ohms; however, the a.c. impedance created by the choke coil construction is so high, especially in response to the fast rise time of the alternator output, at an engine speed of 1,000 R.P.M. and an alternator output of 250 volts at each half cycle, the voltage at conductor 114 rises to only a maximum of 25 or 30 volts for each half cycle. This voltage is applied across primary P of transformer 68 which has a d.c. resistance of only 0.25 ohm. Since the impedance of coil 57 is likewise very high to the fast rise time of the pulses, practically no current flows through coil 57 to the lamps in the event only a single pole switch is used and terminal 36 is connected directly to the lamps. At slower engine speeds of 1,000 R.P.M., for example, both the rise time of the voltage and the output voltage from the alternator under no lamp load fall substantially; however, the maximum voltage at conductor 114 will still be at least 10 volts for each half cycle since the impedance of coil 56 falls substantially.

The transformer 68 saturates at substantially 9 volts for each half cycle so that in the event of a fast rising alternator output voltage, the transformer 68 will saturate quickly and thereafter create no further voltage change in the secondary S. On a slow rising pulse such as created at slower engine speeds, the transformer will take somewhat longer to saturate, but in either event a relatively constant energy pulse will be applied to the secondary S and only the frequency thereof will vary in accordance with engine speed.

The secondary S therefore delivers a constant energy pulse to the gauge coils 100 and 102, having an average current of about 80 milliamps. As the current in coil 102 rises, it bucks the field of magnet 104, thereby allowing the field of coil 100 to swing the magnet 92 and shaft 22 to a position corresponding to the vector addition of magnet 104, and the field of coils 100 and 102. It will be noted that the housing 76 shields the fields of coils 100, 102 and magnets 94 and 104 from being affected by the fields of transformer 68 or coils 56 and 57. The ultimate position of the pointer 20, therefore, depends on the frequency with which the pulses are applied to the gauge coils 100 and 102 since the gauge time averages the pulses for driving the pointer 20 to a position corresponding to the engine and alternator speed.

Figure 11:
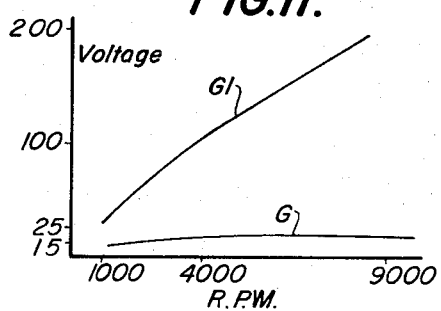

When switch SW is operated to light the lamps L, coil 57 is connected directly to the output of alternator A as would occur of course if terminal 36 were connected directly to the lamp input. Both coils 56 and 57 are now fed directly from the alternator winding A. The lamp will draw substantially 3 amps. and the voltage supplied by the alternator will now be down to substantially 15 volts maximum for each half cycle and will vary only slightly with speed as seen by graph G1 in FIG. 11. Since the alternator voltage has a much slower rise and drop off time, the reactance of choke coil 56 more closely approaches its d.c. resistance, and since both coils 56 and 57 are now connected in shunt to the output of alternator winding A, the voltage at conductor 114 still rises to as much as 10 volts for each half cycle for the slowest engine speed. This ensures that even with the reduced alternator output, the voltage across primary P is sufficient to saturate the transformer 68.

Under some circumstances the rise time of the voltage at conductor 114 may be quite rapid as it tends to follow the rise time of the alternator output voltage. This may tend to induce additional voltage across the secondary; however, the zener diode Z1 will then initiate conduction and the current limiting resistor R2 will then draw circuit. As resistor R2 draws current, the voltage delivered from the secondary will tend to fall, thereby holding the power applied to the gauge coils 100 and 102 constant.

Figure 9:
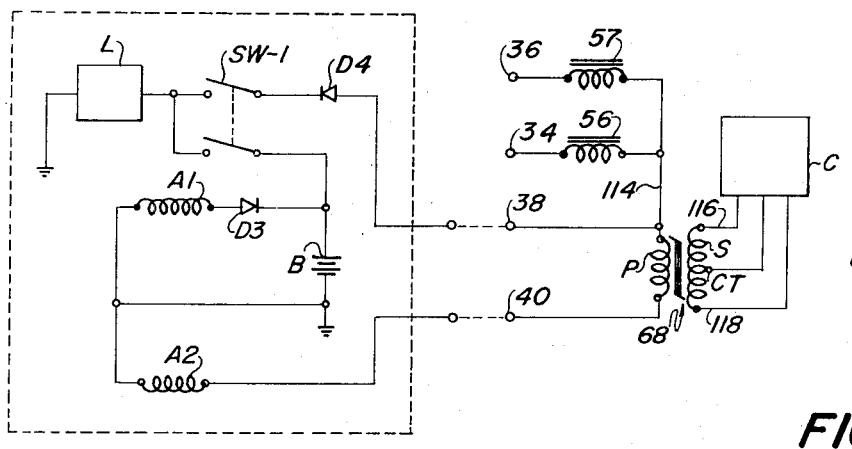
FIG. 9 illustrates the circuit connections of the tachometer to an alternator of a typical snowmobile utilizing a battery.

In the case where the snowmobile is provided a battery B, as shown in FIG. 9, representing one snowmobile circuit arrangement, the positive pole of battery B is often connected through respective rectifiers D3 and D4 arranged to pass positive current from the output of a pair of respective alternator coils marked A1 and A2 of a conventional two or more winding alternator. The connection from winding A2 through rectifiers D4 to the battery is opened and the winding A2 is connected to terminal 40 while the rectifier D4 is connected between terminal 38 and one pole of a switch SW-1 extending to the load L. Another pole on switch SW-1 connects the juncture of the other rectifier D3 with battery B to the load, when the switch SW-1 is operated. Terminal 34 on the tachometer is connected to the vehicle ground.

When the vehicle is operated without lights, switch SW-1 is open and current from winding A2 passes through the primary P of transformer 68 and coil 56 to ground. Coil 56 limits the voltage applied to primary P as previously explained and since most of the voltage drop occurs across coil 56, as described in connection with FIG. 8, the voltage at conductor 114 and across primary P is held to a maximum of 25 volts at each peak at high engine speeds and 10 volts at low engine speeds to saturate the transformer 68 and operate the gauge 24 and attendant circuitry accordingly, which are directed by the box C in FIG. 9.

When switch SW-2 is operated to light the vehicle lamp at load L, the alternator winding A2 is connected through primary P and terminal 38 to the load L and to battery through both poles of switch SW-1 so the voltage at terminal 38 and conductor 114 rises no higher than the battery voltage of 14 volts on the positive half cycle delivered by winding A2. On each negative half cycle provided by winding A2, the major portion of the voltage appears across coil 56 since the diode D4 effectively cuts the alternator output from the load so that no more than 25 volts are across the primary P at the high engine speeds and 10 volts at the low speeds. The transformer 68 saturates on each half cycle and operates the gauge 24 to a position corresponding to the pulse frequency or engine speed to register the same.

Figure 10:
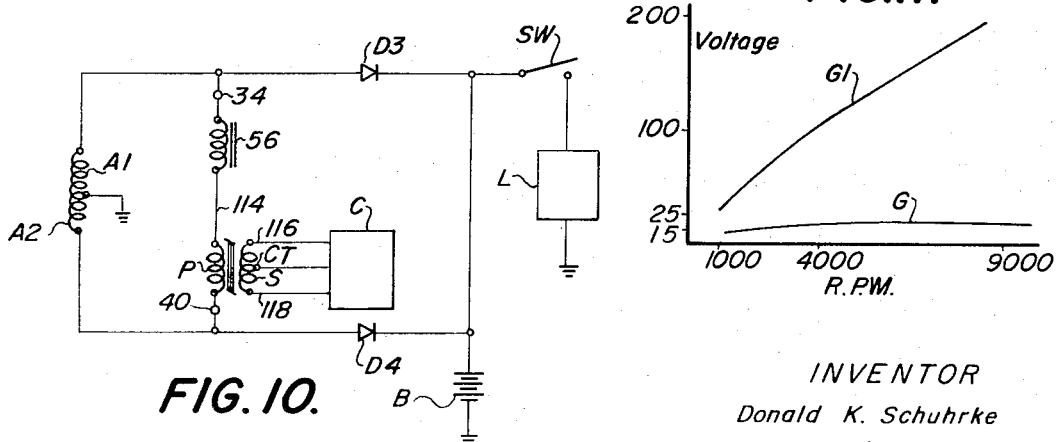
FIG. 10 illustrates the circuit connections of the tachometer to another alternator of another typical snowmobile utilizing a battery.

In the arrangement shown in FIG. 10 illustrating a snowmobile circuit in common use, ground is connected to one end of two alternator windings A1 and A2 and the opposite end of each winding A1 and A2 is connected through a respective diode D3 and D4 poled to pass positive current from the respective alternator winding to the positive pole of a battery B. The positive pole of battery B is selectively connected through a single pole switch SW to a lamp load L.

The tachometer 10 is now arranged with terminal 34 connected between diode D3 and the end of respective alternator winding A1 and terminal 40 is connected between the other diode D4 and the end of the other alternator winding A2 so that coils 56 and P are connected in series across both alternator windings A1 and A2. The circuit connections from the secondary S are the same as in FIG. 8 and are indicated by the box C.

On each positive half cycle that appears at the respective alternator winding end, the voltage at the respective terminal 34 or 40 is limited to the battery voltage, but the other terminal may be swinging to as much as 250 volts negative with switch SW open and the engine operating at high speed. This places about 265 volts across primary P1 and coil 56 in series; however, the reactance of coil 56 is so high at such times that the voltage on conductor 114 and across the primary P is substantially only just above 25 volts to saturate the transformer on each half cycle and drive gauge 24 accordingly. At slower speeds, the voltage between the two alternator windings may be only 30 volts, but the reactance of coil 56 is so much less at these speeds that conductor 114 still reaches substantially 10 volts to saturate the transformer 62 and the gauge 24 is driven accordingly.

When the switch SW in FIG. 10 is operated, the load L is simply connected to each alternator winding through the respective diode and the output voltage of each winding on the positive half cycle is substantially only 15 volts since it effectively is clamped to the battery voltage. On the negative half cycle, however, the voltage which appears across coils 56 and P rises to a level corresponding to the engine speed as described with switch SW open and the transformer 68 saturates as previously described to enable gauge 24 to register the engine speed.

Thus, it will be noted that irrespective of engine speed, load on the alternator on the use of a battery therewith that a voltage between predetermined limits of 9 or 10 volts and 25 volts is supplied to the saturable transformer to ensure its saturation with each signal pulse from the alternator.

The foregoing constitutes a description of an improved and more versatile tachometer whose inventive concepts are believed set forth in the foregoing specification and accompanying claims.

What is claimed is:

1. A tachometer for use with an alternator winding generating output signal pulses having a frequency varying in accordance with engine speed and a half cycle voltage varying between 10 and 250 volts dependent both on engine speed and the electrical load connected to said alternator winding, the improvement comprising a gauge having a winding and a pointer moved in response to the energization of said gauge winding to a position corresponding to the time average of the pulses energizing said gauge winding, a saturable transformer having a primary and a secondary with said secondary connected to said gauge winding for energizing said gauge winding to move said pointer, a pair of choke coils each having one end connected to a common end of said transformer primary and the other end connected to said alternator winding for applying sufficient voltage to said primary for saturating said transformer in response to said output signal pulse being 10 volts and applying a voltage to said primary of less than 50 volts in response to said signal pulses being at substantially 250 volts, said gauge winding comprising a pair of serially connected coils having intersecting axes for generating fields at right angles to each other with one of said serially connected coils connected to both ends of said secondary and the other serially connected coil connected to a point on said secondary intermediate said secondary ends, a shaft carrying said pointer, and a permanent magnet on said shaft spaced adjacent the intersection of the axes of said serially connected coils for rotation about an axis perpendicular to said serially connected coil axes.

2. In the tachometer claimed in claim 1, one housing carrying said choke coils and transformer therein, and a second housing of metal carried within said first housing and in turn carrying said serial coils and magnet within said second housing for magnetically insulating said serial coils and magnet from the field generated by said choke coils and transformer.

3. In the tachometer claimed in claim 2, a second permanent magnet adjustably carried within said second housing for zeroing said pointer and having a field in opposition to the field generated by one of said coils.

4. In the tachometer claimed in claim 2 a resistor and a zener diode in series with said resistor and with both said resistor and diode connected in shunt with both said coils.

5. In the tachometer claimed in claim 2, a pair of spaced plates carried by one wall of said one housing, one plate carrying said choke coils and the other plate carrying said transformer with each plate having a respective opening to accommodate a portion of the physical volume of said choke coils and transformer.

6. A tachometer for use with an alternator winding of the type generating a signal having a frequency varying in accordance with engine speed and a voltage ranging between 25 volts and 250 volts for each half cycle dependent on engine speed and an electrical load connected to said alternator winding, the improvement comprising an air core gauge including a pair of serially arranged coils generating magnetic fields at right angles to each other, one permanent magnet generating a field in opposition to the field generated by one of said windings, a shaft carrying a permanent magnet for enabling said one permanent magnet to bias said shaft to a zero position and for movement to a position corresponding to the vector addition of the magnetic forces between said magnets and coils, a saturable transformer having a primary and a secondary, a pair of rectifiers poled to pass current in the same direction, means connecting each end of said secondary in common through a respective rectifier to one end of one of said serially connected gauge coils, means connecting one of the other gauge coils to said secondary at a point intermediate said secondary ends, a zener diode, a resistor, means connecting said zener diode and resistor serially between said one end of said one gauge coil and said secondary point intermediate said secondary ends, a pair of choke coils each having one end connected to one end of said transformer primary, means for individually connecting the other end of one respective choke coil in series with said primary to said alternator winding, and means for connecting a respective other one of said choke coils to said alternator winding in shunt with said one choke coil and in series with said primary in response to the operation of said alternator winding under electrical load.

7. A tachometer for use with an alternator winding generating an output signal pulse having a frequency varying in accordance with engine speed and a half cycle voltage varying between 10 and 250 volts dependent both on engine speed and the electrical load connected to said alternator winding, the improvement comprising a gauge having a pair of serially connected coils with said coils having intersecting perpendicular axes for generating magnetic fields at right angles to each other, a pointer for said gauge, a shaft for said pointer, a permanent magnet carried by said shaft spaced adjacent the intersection of the axes of said serially connected coils for rotating said shaft and pointer about an axis perpendicular to said serially connected coil axes in response to the energization of said gauge coils to a position corresponding to the time average of the pulses energizing said gauge coils, a saturable transformer having a primary and a secondary, a unidirectional circuit element for each end of said secondary connecting the respective end of said secondary in common to one end of said serially connected gauge coils, a tap intermediate the ends of said secondary connected to the other end of said serially connected gauge coils for energizing said serially connected gauge coils to rotate said pointer, and an inductor having a reactance varying directly with frequency connected between one end of said transformer primary and said alternator winding for applying sufficient voltage to said primary for saturating said transformer in response to said output signal pulse being 10 volts and applying a voltage to said primary of less than 50 volts in response to said signal pulse being at substantially 250 volts whereby said pointer is moved to a position corresponding to the time average of the pulses energizing said serially connected coils.

* * * * *